Nov. 22, 1949  J. A. SNYDER  2,488,744
PROCESS FOR THE REGENERATION OF CATALYST
Filed July 18, 1947
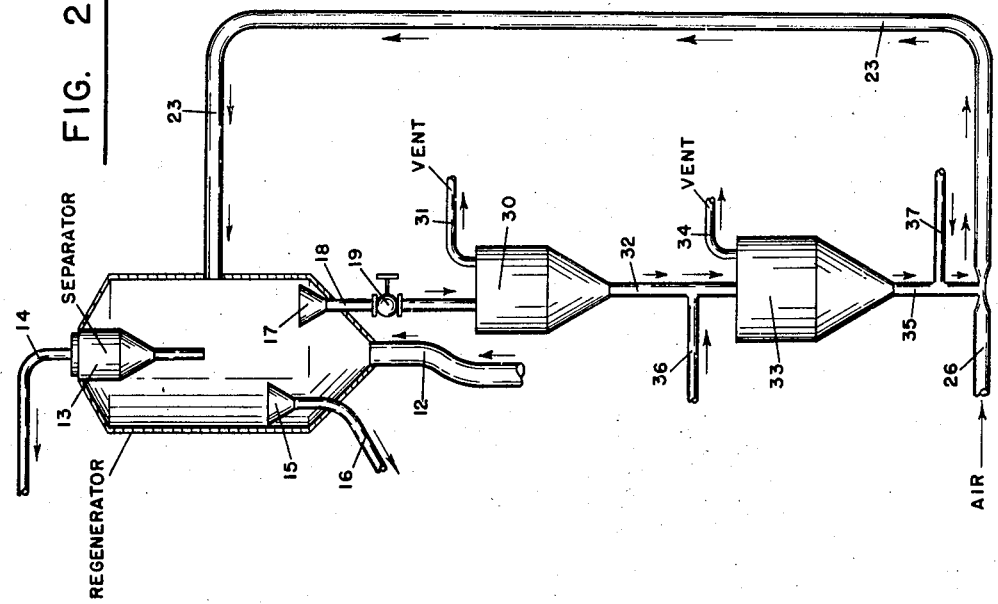
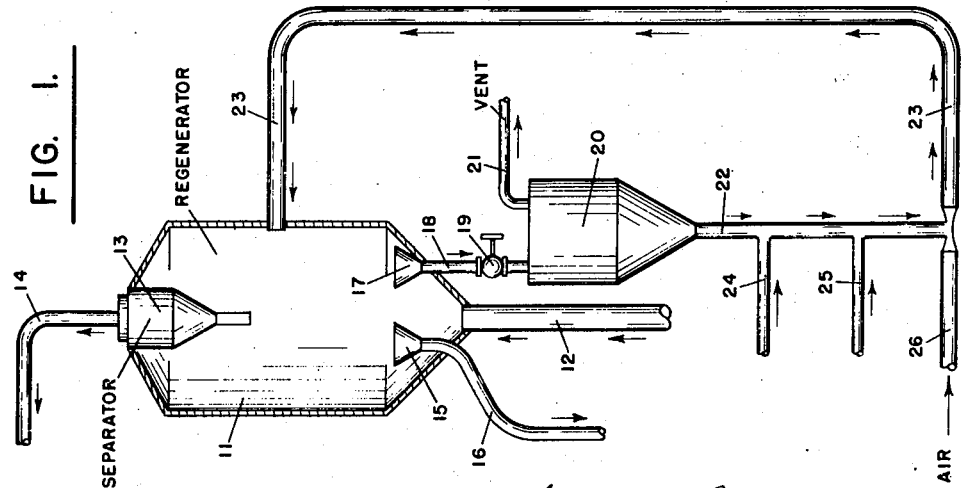
Joseph A. Snyder INVENTOR.
BY Dwight C. Ol...
AGENT Patented Nov. 22, 1949

2,488,744

UNITED STATES PATENT OFFICE 2,488,744

PROCESS FOR THE REGENERATION OF CATALYST

Joseph A. Snyder, Baytown, Tex., assignor, by mesne assignments, to Standard Oil Development Company, Elizabeth, N. J., a corporation of Delaware Application July 18, 1947, Serial No. 761,815

4 Claims. (Cl. 196—52)

The present invention is directed to a method for catalytic cracking employing a fluidized solid catalyst. More particularly, the invention is directed to an improved method for treating a cracking catalyst which is employed in the catalytic cracking of hydrocarbons.

It is known to the art to treat hydrocarbons with finely divided solid catalyst in processes involving a reaction zone and a regeneration zone. These processes may be generally described as involving contacting hydrocarbons with the finely divided solid catalyst in the reaction zone under suitable physical conditions to cause the cracking of a substantial portion of the hydrocarbons charged to the reaction zone, the removal of finely divided spent catalyst and converted hydrocarbons from the reaction zone and the subsequent regeneration of the spent catalyst in a regeneration zone in the presence of combustion gases. The regenerated catalyst may then be recycled to the reaction zone.

The present invention is directed to a catalytic cracking process involving a finely divided or fluidized solid catalyst and is particularly directed to an improvement in the step of regenerating the spent catalyst to obtain a regenerated catalyst of substantially improved activity over that conventionally obtained in the cracking art when employing a fluidized solid catalyst.

The feature of the present invention may be described briefly as involving the regeneration of the fluidized solid catalyst in the presence of combustion gases, the withdrawal of at least a substantial portion of the solid catalyst from contact with the hot combustion gases, the contacting of the withdrawn portion of the catalyst with an anhydrous gaseous mixture of chlorine and hydrogen chloride at a temperature in the range of 850° to 1200° F. to remove at least a substantial portion of metallic contaminating materials from the catalyst, the separation of at least a major portion of the gaseous mixture of chlorine and hydrogen chloride from the treated catalyst and the return of the treated catalyst to the regeneration zone. It is understood that in this process catalyst from the regeneration zone is returned to the raction zone and serves as catalyst in the latter zone.

In conventional catalytic cracking processes employing a fluidized solid catalyst, the catalyst is circulated continuously through the system. The circulating cycle involves passing catalyst to the reaction zone, withdrawal of spent catalyst from the reaction zone to the regeneration zone and the return of the regenerated catalyst to the reaction zone. In the regeneration zone the catalyst is contacted with a combustion gas at a relatively high temperature in order to remove carbonaceous material therefrom and the combustion gases are necessarily removed from the regeneration zone. The combustion gases removed from the regenerating zone invariably remove at least small portions of catalyst from the zone and fresh catalyst must therefore be added to the system to compensate for the catalyst lost. It will be understood that the major portion of the catalyst remains in the system for extended intervals of time and as it is recirculated it becomes contaminated with metallic constituents. Such metallic contaminants may be introduced with the feed stock or eroded from the equipment; the metallic materials employed in the construction of the catalytic cracking unit may cause the catalyst to be contaminated with iron, nickel and chromium. The contaminating metals present in the catalyst undesirably affect the cracking reaction in that they cause increased production of dry gas and carbon.

In accordance with the present invention, the fluidized solid catalyst is treated to remove metallic contaminants therefrom in order to obtain an improved regenerated catalyst. The metallic contaminants are removed from the catalyst being circulated through the catalytic cracking system by intimately contacting the contaminated catalyst with an anhydrous mixture of gaseous chlorine and hydrogen chloride at relatively high temperatures. It is preferred to carry out the step of contacting the contaminated catalyst with a gaseous mixture of chlorine and hydrogen chloride at a temperature no lower than 850° F. In order to prevent the deleterious effects caused by exposure of catalyst to unduly high temperatures, it is desirable that the catalyst be subjected to a temperature no greater than approximately 1200° F.

The invention will now be described in greater detail in conjunction with the drawing in which Fig. 1 illustrates one mode of practicing the present invention, and Fig. 2 presents an alternative procedure for treating the catalyst in accordance with the present invention.

Turning now to the drawing and specifically Fig. 1, a regenerator 11 is provided with an inlet line 12 discharging into the lower end thereof. A cyclone separator 13 is provided in the upper end of vessel 11 and from the separator is an outlet 14 for the separated combustion gases. A funnel shaped member 15 is arranged in the bottom of the regenerator to collect regenerated catalyst dropping to the bottom of the regenerator and in turn is connected to a discharge pipe 16 which may discharge to a reactor not shown. It will be understood that other parts of the apparatus including a reactor connected to pipe 16 and a suitable separating device, such as a Cottrell precipitator, connected to line 14 are conventional to the art but are not shown in the drawing for the purpose of simplifying the description. The arrangement of a complete catalytic cracking unit including reaction and regeneration zones is well known to the art as shown, for example, in U. S. Patent 2,407,374, filed August 1, 1944, by Conrad H. Kollenberg and entitled "Catalytic cracking processes."

Within regenerator 11 is arranged a second funnel shaped member 17 which discharges into a line 18 controlled by a valve 19 which in turn discharges into a hopper shaped vessel 20 which is provided with a vent line 21. The lower portion of the vessel 20 is in the form of a cone and discharges into a vertical downwardly extended pipe 22. Pipe 22 is fluidly connected to a pipe 23 which serves as a recycle line and discharges into regenerator vessel 11 at approximately midpoint thereof. Inlet line 24 is provided by way of which a gaseous mixture of anhydrous hydrogen chloride and chlorine is introduced into line 21. At a point substantially below the point of entry of line 24 an inlet line 25 is arranged for introduction of an inert gas. It should be understood that the gaseous mixture of anhydrous chlorine and hydrogen chloride introduced by line 24 and the inert gas, which may be air, nitrogen, or carbon dioxide, introduced by line 25 may be heated to a temperature preferably within the range of 850° to 1200° F. and that these gases pass upwardly through line 21 countercurrent to the downwardly moving fluidized catalyst allowing contact with metallic iron and its oxides and the formation of volatile iron chloride which may be removed as a vapor. The gaseous mixture, including anhydrous chlorine and hydrogen chloride, introduced by line 24 and inert gas introduced by line 25, together with reaction products, may be removed from the upper end of the vessel 20 by vent line 21. As the fluidized finely divided catalyst reaches the lower end of vertical pipe 22 it is admixed with a stream of air or other free oxygen-containing gases introduced into line 23 through an inlet line 26 and the added air or free oxygen-containing gas serves to carry the treated catalyst through recycle line 23 and thence back into regenerator vessel 11.

In the arrangement shown in Fig. 1 of the drawing it will be seen that a substantial portion of the catalyst in the regenerator system is continuously being treated with a gaseous mixture of anhydrous chlorine and hydrogen chloride at high temperatures in order to reduce the amount of metallic contaminant thereof. It will be apparent that the portion of the catalyst circulated through the system which is treated to reduce the metallic constituents may be varied over a considerable range. If desired, all of the catalyst sent to the regenerator zone may be contacted with the gaseous mixture of anhydrous chlorine and hydrogen chloride at high temperatures but usually it will be found that the treatment of a minor portion of the catalyst in the regenerator zone will produce satisfactory results.

Another mode of practicing the present invention will now be described with relation to Fig. 2. In this figure similar parts of Fig. 1 will be identified by similar numerals for Fig. 2. As in the operation described with relation to Fig. 1 second funnel 17 which discharges into line 18 through line 19 collects catalyst from regenerator vessel 11. This catalyst falls into a hopper shaped vessel 30 which is similar to hopper shaped vessel 20 and is provided with a vent line 31 which may be connected to a chlorine-hydrogen chloride recovery system, if desired. Hopper shaped vessel 30 discharges into a vertical downwardly extended pipe 32 which is fluidly connected to pipe 23 in a manner to be described. The lower portion of hopper shaped vessel 30 is in the form of a cone and discharges into vertical downwardly extending pipe 32. Pipe 32 in turn discharges into a second hopper shaped vessel 33 which is similar in construction to hopper shaped vessel 30 and is also provided with a vent line 34. The lower portion of vessel 33 is in the form of a cone and discharges into a vertical downwardly extended pipe 35 which connects into recycle pipe 23. Line 32 is provided with an inlet line 36 through which a gaseous mixture of anhydrous chlorine and hydrogen chloride is introduced into the system. Line 35 is provided with an inlet line 37 by way of which air, nitrogen, carbon dioxide, or similar inert gases may be introduced into the system. The catalyst flowing downwardly through line 32 from vessel 30 is contacted countercurrently with the gaseous mixture of chlorine and hydrogen chloride introduced by line 36 and is thereby treated to remove metallic contaminating bodies and to improve the activity of the catalyst. The gaseous mixture of chlorine and hydrogen chloride employed to treat the catalyst may be discharged through line 31 as mentioned before to a recovery system for recovery and reuse in the process. The air, nitrogen, carbon dioxide or other inert gas introduced by inlet line 37 serves to remove residual chlorine and hydrogen chloride remaining in the catalyst and to purge the halogens from the system by way of vent line 34. Pretreated catalyst discharges into line 23 as described and is met by a blast of air introduced by inlet 26 which serves to carry the catalyst back to the regenerator vessel 11 by way of line 23 and also serves as a source of oxygen for the regeneration process.

It will thus be seen that the method described in the practice of the present invention in accordance with the embodiment of Fig. 2 allows the substantially complete recovery of chlorine and hydrogen chloride uncontaminated by inert gas used to strip the halogen vapors from the catalyst.

In order to illustrate further the beneficial aspects of the present invention, a silica-alumina catalyst which has been employed in the catalytic cracking of hydrocarbons was treated with a substantially equi-volume mixture of chlorine and hydrogen chloride. The catalyst, prior to its treatment, had been regenerated by subjecting it to a combustion operation at a temperature in the range between 850° to 1200° F. to burn off carbonaceous material. The treatment in accordance with the present invention was carried out at a temperature of 1000° F. for approximately three hours with the gaseous mixture of chlorine and hydrogen chloride flowing over and through the catalyst. It was found that, after the treatment in accordance with the present invention, the iron content, as weight percent Fe₂O₃, was reduced from 0.38% to 0.23% while the gas producing factor had been reduced from 1.71% to 1.51% and the carbon producing factor from 1.53% to 1.43%. It will be apparent from the foregoing comparison that the reduction in the gas producing factor and the carbon producing factor is reflected directly by a reduction in the iron content of the catalyst, indicating that the removal of the iron contaminants has a substantial effect on the activity of the catalyst.

The gas and carbon producing factors are determined by measuring the gas and carbon produced by passing a standard feed stock through the catalyst under standard conditions of temperature and pressure and comparing the amount of gas and carbon produced with the amount obtained when passing the same feed stock over a stream of deactivated catalyst which will give the same gas oil conversion as does the catalyst in question.

As mentioned before, it is preferred to employ a treating temperature in the range from 850° to 1200° F. Preferably a temperature in the neighborhood of 1000° F. should be employed in treating the catalyst in accordance with the present invention. The pressures employed will depend on equipment limitations. However, pressures from about 0 pounds per square inch gauge up to about 100 pounds per square inch gauge will be satisfactory. The amount of hydrogen chloride and chlorine employed may vary from an amount equivalent to the iron content of the catalyst to an amount required to give a vapor velocity of about 1.5 feet per second in the downwardly extending pipes 22 and 32 of Figs. 1 and 2, respectively. The percentage of chlorine in the chlorine-hydrogen chloride mixture may vary from about 1 to about 90%, depending upon the catalyst being treated and the other operating variables.

The invention has been described and illustrated by reference to treatment of catalyst with a gaseous mixture of anhydrous hydrogen chloride and chlorine. It is possible, however, to employ mixtures of other halogens in the treatment of catalysts, for example, a mixture of hydrogen bromide and chlorine may be employed or it may be possible to use hydrogen chloride and bromine as a treating agent. Under some conditions it may be desirable to use a gaseous mixture of anhydrous hydrogen bromide and elementary bromine as a treating agent.

While the invention has been described with respect to treating catalysts employed in the catalytic cracking of hydrocarbons by the fluid technique, it will be apparent that the treating procedure may be applied equally well to Fischer-Tropsch synthesis operations in which the fluid technique is employed when non-iron type catalysts are employed in the synthesis operation.

In the practice of the present invention, it is important that the catalyst which is subjected to treatment with anhydrous hydrogen chloride and chlorine be in a regenerated condition. The term regenerated should mean that the catalyst has been subjected to a combustion operation to remove substantially all of the carbon deposited thereon during the conversion operation. If a catalyst were treated, in accordance with the present invention, which included a substantial quantity of carbon, the chlorine would react with the alumina in the silica-alumina catalyst to form aluminum chloride which would be lost from the system, thus depleting the catalyst of alumina. When a catalyst comprising substantial quantities of carbon is treated with anhydrous hydrogen chloride, the reaction rate is considerably decreased. Thus, too much emphasis cannot be laid on the substantial removal of carbon from the catalyst prior to its treatment as disclosed and claimed hereinafter.

The nature and objects of the present invention having been completely described and illustrated, what I wish to claim as new and useful and to secure by Letters Patent is:

1. In a catalytic cracking process in which there is a cracking zone and a catalyst regeneration zone wherein the catalyst is subjected to a hot combustion supporting gas, the steps of withdrawing catalyst from the regeneration zone, contacting the withdrawn catalyst with a gaseous mixture of anhydrous hydrogen chloride and chlorine at a temperature within the range of 850° to 1200° F. and employing the contacted catalyst in the cracking zone.

2. In a catalytic cracking process in which there is a cracking zone and a catalyst regeneration zone, the steps of contacting the catalyst in the regeneration zone with hot combustion supporting gas, withdrawing a portion of catalyst from the regeneration zone, contacting the withdrawn catalyst with a gaseous mixture of anhydrous hydrogen chloride and chlorine at a temperature in the range of 850° to 1200° F. under conditions to remove at least a substantial portion of metallic compounds therefrom, separating hydrogen chloride and chlorine mixture from the contacted catalyst and returning the contacted catalyst to the regeneration zone.

3. In a catalytic cracking process wherein finely divided solid catalyst is intimately contacted with hydrocarbons in a cracking zone under conditions to cause cracking of at least a portion of the hydrocarbons and wherein catalyst is withdrawn from the cracking zone to a catalyst regeneration zone, the steps of contacting catalyst with a hot combustion supporting gas in the regeneration zone, withdrawing a substantial portion of finely divided catalyst from the regeneration zone and contacting it with a gaseous mixture of anhydrous hydrogen chloride and chlorine at a temperature in the range of 850° to 1200° F. to remove metallic compounds therefrom, separating at least a major portion of the hydrogen chloride and chlorine mixture from the contacted catalyst, subsequently returning the contacted catalyst to the catalyst regeneration zone and recycling catalyst from the catalyst regeneration zone to the cracking zone.

4. In a catalytic cracking process wherein finely divided solid catalyst is intimately contacted with hydrocarbons in a cracking zone under conditions to cause cracking of at least a portion of the hydrocarbons and wherein catalyst is withdrawn from the cracking zone to a catalyst regeneration zone, the steps of contacting catalyst with a hot combustion supporting gas in the regeneration zone, withdrawing a substantial portion of finely divided catalyst from the regeneration zone and contacting it with a gaseous mixture of anhydrous hydrogen chloride and chlorine at a temperature in the range of 850° to 1200° F. to remove metallic compounds therefrom, separating at least a major portion of the hydrogen chloride and chlorine mixture from the contacted catalyst, purging the contacted catalyst with an inert gas to remove residual hydrogen chloride and chlorine therefrom, and subsequently returning the contacted catalyst to the catalyst regeneration zone and recycling catalyst from the catalyst regeneration zone to the cracking zone.

JOSEPH A. SNYDER.

REFERENCES CITED

The following references are of record in the file of this patent:

UNITED STATES PATENTS

| Number | Name | Date |
|---|---|---|
| 1,430,454 | Low | Sept. 26, 1922 |
| 1,785,464 | Suzuki et al. | Dec. 16, 1930 |
| 1,848,723 | Jaeger | Mar. 8, 1932 |
| 2,246,900 | Schulze et al. | June 24, 1941 |
| 2,380,731 | Drake | July 31, 1945 |
| 2,407,701 | Jones et al. | Sept. 17, 1946 |
| 2,414,736 | Gray | Jan. 21, 1947 |
| 2,430,724 | Meadow | Nov. 11, 1947 |

FOREIGN PATENTS

| Number | Country | Date |
|---|---|---|
| 115,333 | Germany | Oct. 31, 1900 |